US011577834B1

United States Patent
Meng et al.

(10) Patent No.: US 11,577,834 B1
(45) Date of Patent: Feb. 14, 2023

(54) METHOD AND SYSTEM FOR SYNCHRONIZING VIRTUAL AND REAL STATUSES OF DIGITAL TWIN SYSTEM OF UNMANNED AERIAL VEHICLE (UAV)

(71) Applicant: GUANGDONG UNIVERSITY OF TECHNOLOGY, Guangzhou (CN)

(72) Inventors: Wei Meng, Guangzhou (CN); Yuanlin Yang, Guangzhou (CN); Jiayao Zang, Guangzhou (CN); Renquan Lu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/551,230

(22) Filed: Dec. 15, 2021

(30) Foreign Application Priority Data

Nov. 5, 2021 (CN) .......................... 202111306986.1

(51) Int. Cl.
*B64C 39/02* (2006.01)
*G06N 20/00* (2019.01)
*G05B 19/4155* (2006.01)

(52) U.S. Cl.
CPC ........ *B64C 39/024* (2013.01); *G05B 19/4155* (2013.01); *G06N 20/00* (2019.01);
(Continued)

(58) Field of Classification Search
CPC ............ B64C 39/024; B64C 2201/141; G06N 20/00; G05B 19/4155; G05B 2219/42033; G05B 2219/42052
(Continued)

(56) References Cited

U.S. PATENT DOCUMENTS 10,509,415 B2    12/2019    Bosworth et al.
10,642,270 B2    5/2020    Duda et al.
(Continued)

FOREIGN PATENT DOCUMENTS

WO    WO-2018057828 A2 *    3/2018    .......... B64C 39/024
WO    WO-2019148188 A1 *    8/2019    ............... B64C 1/36

OTHER PUBLICATIONS

Johnson et al., "Control and Tracking of Longitudinal Dynamics of UAVs in Synchronized Motion," 2013, Publisher: IEEE.*
(Continued)

*Primary Examiner* — Tuan C To
(74) *Attorney, Agent, or Firm* — True Shepherd LLC; Andrew C. Cheng

(57) ABSTRACT

A method for synchronizing virtual and real statuses of a digital twin system of an unmanned aerial vehicle (UAV) includes: performing parameter configuration for a virtual object system and a physical object system of the UAV; performing time synchronization between the virtual object system and the physical object system; detecting an event trigger type, wherein the event trigger type is a training event or a monitoring event; and triggering a corresponding synchronization controller based on the detected event trigger type, such that the synchronization controller performs result synchronization and process synchronization for the virtual object system and the physical object system based on the event trigger type, where a synchronization controller corresponding to the training event is a controller for synchronizing a physical object to a virtual object, and a synchronization controller corresponding to the monitoring event is a controller for synchronizing the virtual object to the physical object.

5 Claims, 7 Drawing Sheets

(52) U.S. Cl.
CPC .. *B64C 2201/027* (2013.01); *B64C 2201/141* (2013.01); *G05B 2219/42033* (2013.01); *G05B 2219/42052* (2013.01)

(58) Field of Classification Search
USPC .......................................................... 701/33
See application file for complete search history.

(56) References Cited

U.S. PATENT DOCUMENTS

| | | | |
|---|---|---|---|
| 10,650,621 | B1 | 5/2020 | King et al. |
| 11,397,913 | B2* | 7/2022 | Colella ............. G01C 21/3423 |
| 11,405,801 | B1* | 8/2022 | Qureshi ................ H04W 28/16 |
| 11,453,510 | B1* | 9/2022 | Murphy ................ B64D 45/08 |
| 11,459,101 | B2* | 10/2022 | Moon ................... B64C 39/024 |
| 2018/0319495 | A1* | 11/2018 | Tu ........................ G05D 1/0011 |
| 2020/0001735 | A1* | 1/2020 | Cheng .................... B60L 53/36 |
| 2020/0023969 | A1* | 1/2020 | Moon ................... B64C 39/024 |
| 2020/0023999 | A1* | 1/2020 | Chae .................... H02J 7/0044 |
| 2020/0033854 | A1* | 1/2020 | Jeong .................... G05D 1/105 |
| 2020/0333795 | A1* | 10/2020 | Jang ....................... G06N 3/006 |
| 2021/0116941 | A1* | 4/2021 | Lee ....................... G01S 17/894 |
| 2021/0331813 | A1* | 10/2021 | Yi ........................ G05D 1/0022 |
| 2022/0129661 | A1* | 4/2022 | Li .......................... G08G 5/003 |
| 2022/0248181 | A1* | 8/2022 | Yu ........................ H04W 48/16 |

OTHER PUBLICATIONS

Yaohong et al., "Cooperative Localization of UAV Based on Information Synchronization," 2010, Publisher: IEEE.*

Travijs et al., "Output Feedback Control of a Quadrotor UAV Using Neural Networks," 2010, vol. 21, Publisher: IEEE.*

* cited by examiner

METHOD AND SYSTEM FOR SYNCHRONIZING VIRTUAL AND REAL STATUSES OF DIGITAL TWIN SYSTEM OF UNMANNED AERIAL VEHICLE (UAV)

CROSS-REFERENCE TO RELATED APPLICATIONS

This application claims priority to Chinese Patent Application No. 202111306986.1 with a filing date of Nov. 5, 2021. The content of the aforementioned application, including any intervening amendments thereto, is incorporated herein by reference.

TECHNICAL FIELD

The present disclosure relates to the technical field of status monitoring of an unmanned aerial vehicle (UAV), and in particular, to a method and system for synchronizing virtual and real statuses of a digital twin system of an UAV.

BACKGROUND

The digital twin technology is a multi-disciplinary, multi-physical quantity, multi-scale, and multi-probability simulation process that makes full use of a physical model, sensor update, an operation history, and other data. It completes mapping in virtual space, so as to reflect a whole life cycle of a corresponding physical device. In the fields of smart city and intelligent manufacturing, the digital twin technology is used for design, monitoring, prediction, and optimization. In this technology, two-way interaction and iterative optimization are performed on a virtual end and a physical end to improve efficiency of product design and monitorability of manufacturing and maintenance.

With advantages of virtual reality interconnection, the digital twin technology is gradually combined with a UAV. A virtual UAV model is constructed to simulate behaviors of a physical UAV in a whole cycle, monitor a status of the UAV, optimize a task process of the UAV, and improve an autonomous task capability of the UAV. A difference from application of the digital twin technology in the industrial field is that a motion region of the UAV is not fixed. The UAV often carries out patrol inspection, meal delivery, tracking and other tasks in a large range at medium and low altitudes. Therefore, in a digital twin system for the UAV, communication between the physical end and the virtual end depends on a wireless communication network. However, the wireless communication network has a higher transmission delay in communication compared with the wired Ethernet. How to realize status synchronization between a virtual UAV and the physical UAV in a communication network with a delay is a premise of virtual reality training and physical real-time monitoring.

At present, the research on UAV status synchronization mainly focuses on status synchronization among a plurality of physical UAVs, especially on status synchronization between a child UAV and a parent UAV (a status of the child UAV is synchronized to the parent UAV). An operation cycle of the digital twin system includes two important parts: training performed by the virtual end for the physical end and monitoring performed by the virtual end for the physical end. During training performed by the virtual end for the physical end, a status of the physical end needs to be synchronized to the virtual end, such that the virtual end controls the physical end. During monitoring performed by the virtual end for the physical end, a status of the virtual end needs to be synchronized to the physical end, such that the virtual end monitors the physical end. Therefore, for status synchronization of the digital twin system, it is necessary to consider different synchronization directions of a system status in different stages. However, the digital twin system emphasizes comprehensive mapping between virtual and real statuses, instead of only considering result synchronization but ignoring process synchronization. Therefore, an urgent technical problem to be resolved by those skilled in the art is to autonomously switch a status synchronization direction and support both result synchronization and process synchronization for the digital twin system of the UAV.

SUMMARY

Embodiments of the present disclosure provide a method and system for synchronizing virtual and real statuses of a digital twin system of a UAV, to autonomously switch a status synchronization direction of digital twin system of a UAV and support both result synchronization and process synchronization.

In view of this, the present disclosure provides a method for synchronizing virtual and real statuses of a digital twin system of a UAV, including:

performing parameter configuration for a virtual object system and a physical object system of the UAV;

performing time synchronization between the virtual object system and the physical object system;

detecting an event trigger type, wherein the event trigger type comprises a training event and a minoring event; and triggering a corresponding synchronization controller based on the detected event trigger type, such that the synchronization controller performs result synchronization and process synchronization for the virtual object system and the physical object system based on the event trigger type, where a synchronization controller corresponding to the training event is a controller for synchronizing a physical object to a virtual object, and a synchronization controller corresponding to the monitoring event is a controller for synchronizing the virtual object to the physical object.

Optionally, the controller for synchronizing the physical object to the virtual object and the controller for synchronizing the virtual object to the physical object have a same structure, and each includes a result parameter feedback control module, a process parameter feedback control module, a fusion module, an output transformation module, and an event trigger switch module, where the result parameter feedback control module and the process parameter feedback control module each are connected to an input terminal of the fusion module, an output terminal of the fusion module is connected to the output transformation module, and the output transformation module is connected to the event trigger switch module;

an input quantity and a feedback quantity of the result parameter feedback control module of the controller for synchronizing the physical object to the virtual object are a status quantity of the virtual object and a status quantity of the physical object respectively, an input quantity and a feedback quantity of the process parameter feedback control module of the controller for synchronizing the physical object to the virtual object are finite-time mileage information of the virtual object and finite-time mileage information of the physical object respectively, and the event trigger switch module is connected to the physical object; and an input quantity and a feedback quantity of the result parameter feedback control module of the controller for synchronizing the virtual object to the physical object are the status quantity of the physical object and the status quantity of the virtual object respectively, an input quantity and a feedback quantity of the process parameter feedback control module of the controller for synchronizing the virtual object to the physical object are the finite-time mileage information of the physical object and the finite-time mileage information of the virtual object respectively, and the event trigger switch module is connected to the virtual object.

Optionally, the detecting an event trigger type includes:

detecting a current operation stage of a digital twin system; and if the current operation stage is a stage of training the physical object by the virtual object, detecting a first deviation between a task track of the physical object and a task track of the virtual object, and triggering the monitoring event when the first deviation is less than a first preset value; or if the current operation stage is a stage of monitoring the physical object by the virtual object, detecting a second deviation between a current status track of the virtual object and a training tack, and triggering the training event if the second deviation is greater than a second preset value.

Optionally, the result parameter feedback control module and the process parameter feedback control module adopt a proportional-integral-derivative (PID) control algorithm, a fuzzy control algorithm, or a sliding mode control algorithm.

Optionally, a fusion formula of the fusion module is as follows:

$$y = \partial_1 \times u_1 + \partial_2 \times u_2$$

$$\partial_1 + \partial_2 = 1$$

wherein y represents an output of the fusion module, $u_1$ represents an output of the result parameter feedback control module, $u_2$ represents an output of the process parameter feedback control module, and $\partial_1$ and $\partial_2$ are weight coefficients.

Optionally, a transformation formula of the output transformation module is as follows:

$$w = \begin{cases} L_{max}, & k \times y \geq L_{max} \\ k \times y, & \text{other cases} \\ L_{min}, & k \times y \geq L_{min} \end{cases}$$

wherein w represents an output of the output transformation module, y represents the output of the fusion module, k represents a to-be-tuned parameter, $L_{max}$ represents an upper output limit, and $L_{min}$ represents a lower output limit.

Optionally, the method further includes:

detecting whether current time reaches a preset time, and performing time synchronization between the virtual object system and the physical object system again if the current time reaches the preset time.

A second aspect of the present disclosure provides a system for synchronizing virtual and real statuses of a digital twin system of a UAV, including the following components of the UAV: a virtual object system, a physical object system, a parameter configuration module, a time synchronization module, an event detection module, a controller for synchronizing a physical object to a virtual object, and a controller for synchronizing the virtual object to the physical object;

the parameter configuration module is configured to perform parameter configuration for the virtual object system and the physical object system of the UAV;

the time synchronization module is configured to perform time synchronization between the virtual object system and the physical object system;

the event detection module is configured to detect an event trigger type, and trigger a corresponding synchronization controller based on the detected event trigger type, the event trigger type may be a training event or a minoring event;

the controller for synchronizing the physical object to the virtual object is configured to: when the event detection module detects that the event trigger type is a trigger instruction of the training event, perform result synchronization and process synchronization for the virtual object system and the physical object system based on the training event; and the controller for synchronizing the virtual object to the physical object is configured to: when the event detection module detects that the event trigger type is a trigger instruction of the monitoring event, perform result synchronization and process synchronization for the virtual object system and the physical object system based on the monitoring event.

Optionally, the controller for synchronizing the physical object to the virtual object and the controller for synchronizing the virtual object to the physical object have a same structure, and each include a result parameter feedback control module, a process parameter feedback control module, a fusion module, an output transformation module, and an event trigger switch module, where the result parameter feedback control module and the process parameter feedback control module each are connected to an input terminal of the fusion module, an output terminal of the fusion module is connected to the output transformation module, and the output transformation module is connected to the event trigger switch module;

an input quantity and a feedback quantity of the result parameter feedback control module of the controller for synchronizing the physical object to the virtual object are a status quantity of the virtual object and a status quantity of the physical object respectively, an input quantity and a feedback quantity of the process parameter feedback control module of the controller for synchronizing the physical object to the virtual object are finite-time mileage information of the virtual object and finite-time mileage information of the physical object respectively, and the event trigger switch module is connected to the physical object; and an input quantity and a feedback quantity of the result parameter feedback control module of the controller for synchronizing the virtual object to the physical object are the status quantity of the physical object and the status quantity of the virtual object respectively, an input quantity and a feedback quantity of the process parameter feedback control module of the controller for synchronizing the virtual object to the physical object are the finite-time mileage information of the physical object and the finite-time mileage information of the virtual object respectively, and the event trigger switch module is connected to the virtual object.

Optionally, the event detection module is specifically configured to:

detect a current operation stage of a digital twin system; and if the current operation stage is a stage of training the physical object by the virtual object, detect a first deviation between a task track of the physical object and a task track of the virtual object, and trigger the monitoring event when the first deviation is less than a first preset value; or if the current operation stage is a stage of monitoring the physical object by the virtual object, detect a second deviation between a current status track of the virtual object and a training tack, and trigger the training event if the second deviation is greater than a second preset value.

It can be learned from the above technical solutions that the embodiments of the present disclosure have the following advantages:

The method for synchronizing virtual and real statuses of the digital twin system of the UAV in the embodiments of the present disclosure can perform two-way synchronization between virtual and real statuses in the training stage and the monitoring stage, and perform corresponding result synchronization and process synchronization based on the event trigger type, to realize autonomous switching based on event trigger, and ensure autonomy of the digital twin system. This achieves a technical effect of switching a status synchronization direction of the digital twin system of the UAV autonomously and supporting both result synchronization and process synchronization.

DETAILED DESCRIPTION OF THE EMBODIMENTS

To enable those skilled in the art to better understand the solutions in the present disclosure, the technical solutions in the embodiments of the present disclosure will be clearly and completely described below with reference to the accompanying drawings in the embodiments of the present disclosure. Obviously, the described embodiments are merely some rather than all of the embodiments of the present disclosure. All other embodiments obtained by a person of ordinary skill in the art on the basis of the embodiments of the present invention without creative efforts shall fall within the protection scope of the present invention.

Figure 1:
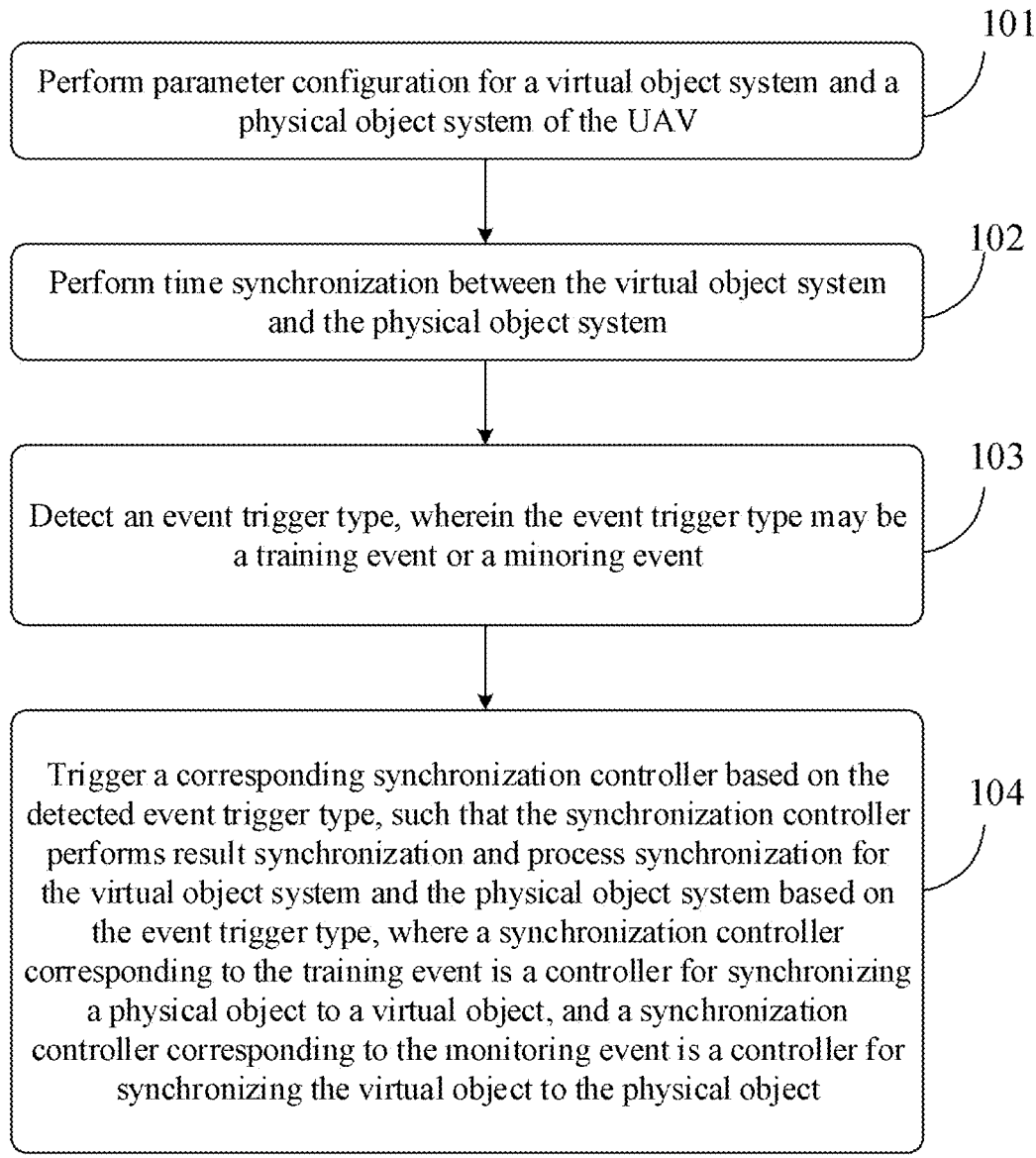
FIG. 1 is a schematic flowchart of a method for synchronizing virtual and real statuses of a digital twin system of a UAV according to an embodiment of the present disclosure.
Figure 2:
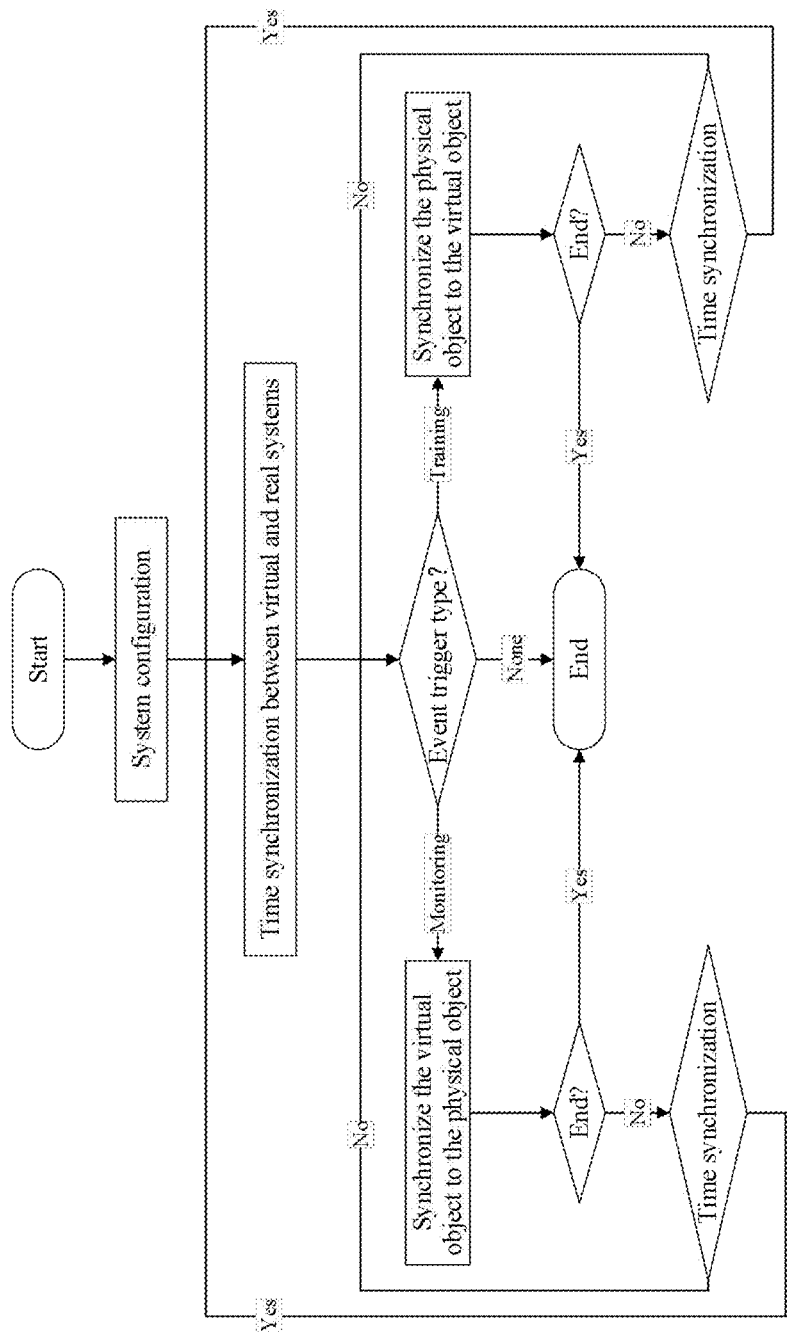
FIG. 2 is a logical block diagram of a method for synchronizing virtual and real statuses of a digital twin system of a UAV according to an embodiment of the present disclosure.

For ease of understanding, as shown in FIG. 1 and FIG. 2, the present disclosure provides an embodiment of a method for synchronizing virtual and real statuses of a digital twin system of a UAV. The method includes the following steps:

Step 101: Perform parameter configuration for a virtual object system and a physical object system of the UAV.

In this embodiment of the present disclosure, parameters of the virtual object system and the physical object system need to be configured first, including a sensor position, a data processing parameter, a motor parameter, a maximum speed and maximum acceleration of the UAV, and the like.

Step 102: Perform time synchronization between the virtual object system and the physical object system.

Because both a control system of a virtual UAV and a control system of a physical UAV are digital sampling systems, both the virtual object system and the physical object system need to be synchronized with a clock source, such as time.windows.com. The time synchronization may be completed by running a command line, for example, running udo ntpdate time.windows.com and sudo hwclock-localtime-systohc in the Ubuntu system.

In an embodiment, a timer may be set to ensure time synchronization between the virtual object system and the physical object system. When preset time is reached, the virtual object system and the physical object system periodically synchronize system time with a configured time source to ensure time consistency between the virtual and real systems.

Step 103: Detect an event trigger type, wherein the event trigger type may be a training event or a minoring event.

Event trigger type detection is mainly performed to switch a synchronization type in a current state. A status quantity monitored by the system is different in different operation stages of a digital twin system. When the monitored status quantity is not within a preset range, a current operation stage is switched to another operation stage, in other words, a training stage is switched to a monitoring stage, or the monitoring stage is switched to the training stage. Specifically, if the monitored status quantity in a stage of training a physical object by a virtual object is a deviation between a task track of the physical object and a task track of the virtual object, namely, a first deviation (this deviation may be equivalent to an inter-point distance deviation calculated by sampling n position points in the track), when the first deviation is less than a first preset value, a monitoring system is triggered to switch a current system synchronization status to a state of synchronizing the virtual object to the physical object, in other words, the detected event trigger type is the monitoring event. Likewise, if a variable for triggering the monitoring system in a stage of monitoring the physical object by the virtual object is a deviation between a current status track of the virtual object and a training track, namely, a second deviation, when the second deviation is greater than a second preset value, it indicates that a current operation status of the physical object system has deviated from a training state due to impact of a physical environment, and a model needs to be retrained. Therefore, an event trigger signal is generated to switch the current synchronization status to the training stage, in other words, the detected event trigger type is the training event. This process may be mathematically expressed as follows:

$$y' = \begin{cases} y_1' = \begin{cases} 0, & \text{other cases} \\ 1, & \|x_1 - x_2\| \le \varepsilon_1 \end{cases} \\ y_2' = \begin{cases} 0, & \text{other cases} \\ 1, & \|x_1 - x_3\| \le \varepsilon_2 \end{cases} \end{cases}$$

wherein, y' represents an output of event trigger type monitoring, $y_1'$ represents an output of synchronizing the virtual object to the physical object, $y_2'$ represents an output of synchronizing the physical object to the virtual object, $x_1$ represents the training state, $x_2$ represents a status of the virtual object, $x_3$ represents a status of the physical object, $\varepsilon_1$ represents the first deviation, and $\varepsilon_2$ represents the second deviation.

Step 104: Trigger a corresponding synchronization controller based on the detected event trigger type, such that the synchronization controller performs result synchronization and process synchronization for the virtual object system and the physical object system based on the event trigger type, where a synchronization controller corresponding to the training event is a controller for synchronizing the physical object to the virtual object, and a synchronization controller corresponding to the monitoring event is a controller for synchronizing the virtual object to the physical object.

After the event trigger type is determined, the corresponding synchronization controller is started to perform result synchronization and process synchronization for the virtual object system and the physical object system. For the training event, the corresponding synchronization controller is the controller for synchronizing the physical object to the virtual object. The controller performs parameter control by using a parameter of the virtual object of the virtual object system as an input and a parameter of the physical object of the physical object system as a feedback, so as to perform result synchronization and process synchronization between the physical object and the virtual object. For the monitoring event, the corresponding synchronization controller is the controller for synchronizing the virtual object to the physical object. The controller performs parameter control by using the parameter of the physical object of the physical object system as an input and the parameter of the virtual object of the virtual object system as a feedback, so as to perform result synchronization and process synchronization between the physical object and the virtual object.

The method for synchronizing virtual and real statuses of a digital twin system of a UAV in this embodiment of the present disclosure can perform two-way synchronization between virtual and real statuses in the training stage and the monitoring stage, and perform corresponding result synchronization and process synchronization based on the event trigger type, to realize autonomous switching based on event trigger, and ensure autonomy of the digital twin system. This achieves a technical effect of switching a status synchronization direction of the digital twin system of the UAV autonomously and supporting both result synchronization and process synchronization.

Figure 3:
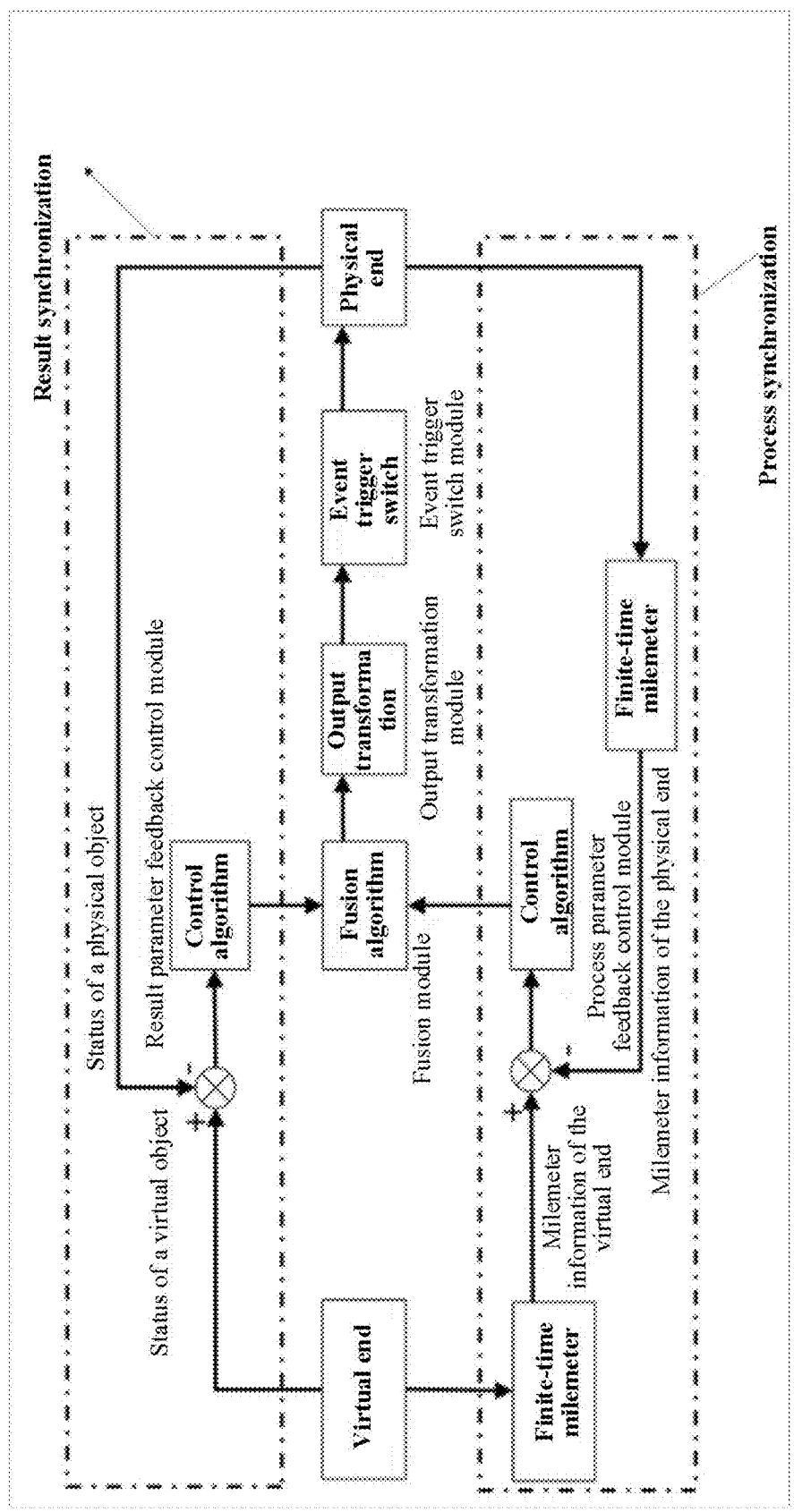
FIG. 3 is a schematic structural diagram of a controller for synchronizing a physical object to a virtual object according to an embodiment of the present disclosure.
Figure 4:
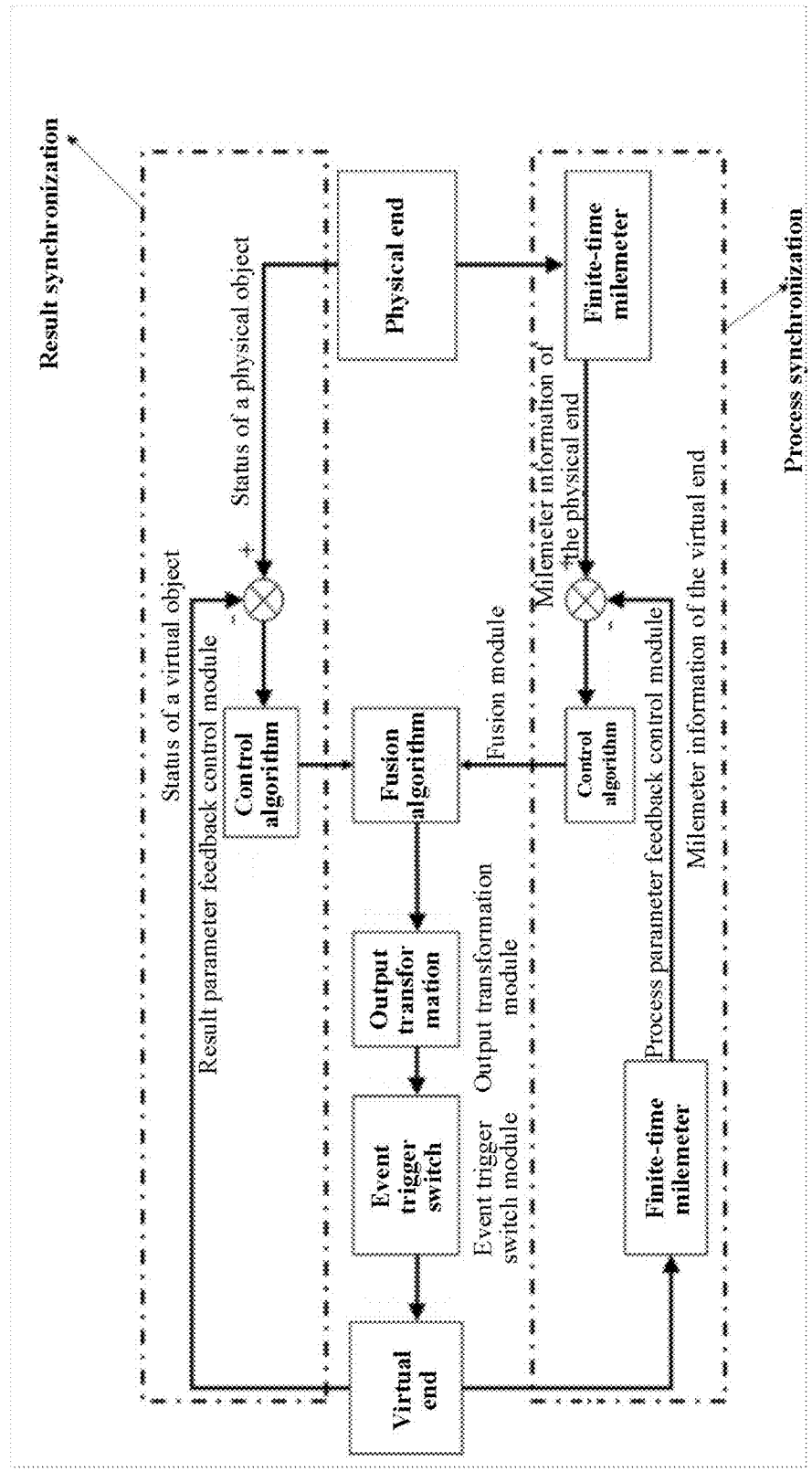
FIG. 4 is a schematic structural diagram of a controller for synchronizing a virtual object to a physical object according to an embodiment of the present disclosure.

In an embodiment, as shown in FIG. 3 and FIG. 4, the controller for synchronizing the physical object to the virtual object and the controller for synchronizing the virtual object to the physical object have a same structure, and each include a result parameter feedback control module, a process parameter feedback control module, a fusion module, an output transformation module, and an event trigger switch module, where the result parameter feedback control module and the process parameter feedback control module each are connected to an input terminal of the fusion module, an output terminal of the fusion module is connected to the output transformation module, and the output transformation module is connected to the event trigger switch module.

An input quantity and a feedback quantity of the result parameter feedback control module of the controller for synchronizing the physical object to the virtual object are a status quantity of the virtual object and a status quantity of the physical object respectively, an input quantity and a feedback quantity of the process parameter feedback control module of the controller for synchronizing the physical object to the virtual object are finite-time mileage information of the virtual object and finite-time mileage information of the physical object respectively, and the event trigger switch module is connected to the physical object (namely, a physical end in FIG. 3 and FIG. 4).

An input quantity and a feedback quantity of the result parameter feedback control module of the controller for synchronizing the virtual object to the physical object are the status quantity of the physical object and the status quantity of the virtual object respectively, an input quantity and a feedback quantity of the process parameter feedback control module of the controller for synchronizing the virtual object to the physical object are the finite-time mileage information of the physical object and the finite-time mileage information of the virtual object respectively, and the event trigger switch module is connected to the virtual object (namely, a virtual end shown in FIG. 3 and FIG. 4).

It should be noted that the controller for synchronizing the physical object to the virtual object and the controller for synchronizing the virtual object to the physical object have the same structure, but different input quantities and output quantities. The controller for synchronizing the physical object to the virtual object and the controller for synchronizing the virtual object to the physical object each are composed of two feedback control loops. Outputs of the two feedback control loops pass through the fusion module and the output transformation module in turn, and are finally output to a controlled object under trigger control of the event trigger switch module. The result parameter feedback control module and the process parameter feedback control module convert an input deviation into an output quantity according to a corresponding control rule. The modules may adopt a conventional PID control algorithm, a fuzzy control algorithm, or a sliding mode control algorithm. Description is provided by using an example in which the conventional PID control algorithm is adopted. Assuming that e(t) is an input deviation at a time point t and u(t) is an output quantity at the time point t, e(t) and u(t) meet the following relationship:

$$u(t) = K_P(e(t)) + \frac{1}{T_i}\int_0^t e(t)dt + \frac{T_d de(t)}{dt}$$

wherein, $K_P$, $T_i$, and $T_d$ are to-be-tuned parameters.

The fusion module fuses outputs of the result parameter feedback control module and the process parameter feedback control module, and then outputs a fused output to the output transformation module. The fusion module may use a weighted average method to sum different weights assigned to the outputs of the result parameter feedback control module and the process parameter feedback control module. A mathematical expression is as follows:

$y = \partial_1 \times u_1 + \partial_2 \times u_2$ $\partial_1 + \partial_2 = 1$ wherein, y represents an output of the fusion module, $u_1$ represents an output of the result parameter feedback control module, $u_2$ represents an output of the process parameter feedback control module, and $\partial_1$ and $\partial_2$ are weight coefficients.

The output transformation module further transforms the fused output based on a requirement of an output control quantity. The transformation includes output amplitude limiting, output multiplication, or output demultiplication. A mathematical expression is as follows:

$$w = \begin{cases} L_{max}, & k \times y \geq L_{max} \\ k \times y, & \text{other cases} \\ L_{min}, & k \times y \geq L_{min} \end{cases}$$

wherein, w represents an output of the output transformation module, y represents the output of the fusion module, k represents a to-be-tuned parameter, $L_{max}$ represents an upper output limit, and $L_{min}$ represents a lower output limit.

In the process synchronization stage, a parameter of a finite-time milometer is used for deviation control, mainly including calculation of instantaneous motion statuses of the physical object and the virtual object. A finite-time milometer module is separately added to the virtual object system and the physical object system, and a same sampling time difference is configured. Milometer information, obtained through speed calculation, of the UAV has a cumulative error. However, in this embodiment of the present disclosure, the milometer neither performs long-time cumulative calculation nor estimates a position status of an object, but serves as an observer of a dynamic motion of the object. If the statuses of the virtual object and the physical object are synchronized, it means that displacements of the two objects should be the same within same sampling time. If the displacements of the two objects are different, even if final result statuses of the two objects are the same, it does not mean that a status synchronization requirement of the digital twin system is met, and further adjustment is needed. A calculation formula of mileage information of the finite-time milometer is as follows:

$$x(\Delta t) = \frac{(v_x^1 + v_x^2)}{2} \times \Delta t$$

$$y(\Delta t) = \frac{(v_y^1 + v_y^2)}{2} \times \Delta t$$

$$z(\Delta t) = \frac{(v_z^1 + v_y^2)}{2} \times \Delta t$$

$$\Delta t = |t_1 - t_2|$$

wherein, $x(\Delta t)$, $y(\Delta t)$, and $z(\Delta t)$ represent displacements of the UAV in x-axis, y-axis, and z-axis directions within time $\Delta t$ respectively, $t_1$ and $t_2$ are two measurement time points, $v_x^1$, $v_y^1$, and $v_z^1$ represent speeds in the x-axis, y-axis, and z-axis directions at $t_1$ respectively, and $v_x^2$, $v_y^2$, and $v_z^2$ represent speeds in the x-axis, y-axis, and z-axis directions at $t_2$ respectively.

Both an input quantity and a feedback quantity of result synchronization are current statuses of the object. In the process of synchronizing the virtual object to the physical object, an input quantity is a real-time status of the physical object, such as a position of the UAV, and a corresponding feedback quantity is a real-time position of the virtual UAV. A correction amount is obtained by using the control algorithm of the result parameter feedback control module, and then transformed into an input of the controller of the virtual UAV by using the output transformation module, such as a speed command. Such closed-loop control can ensure final status synchronization between the virtual UAV and the physical UAV, in other words, realize result synchronization. Both an input quantity and a feedback quantity of process synchronization are milometer information, calculated within finite time, of the UAV. In the process of synchronizing the physical object to the virtual object, an input quantity is milometer information of the virtual object, and a feedback quantity is milometer information of the physical object. The milometer information of the virtual object and the milometer information of the physical object are compared, and then a correction amount is obtained by using the control algorithm of the process parameter feedback control module and applied to the virtual object, to realize process synchronization.

Figure 5:
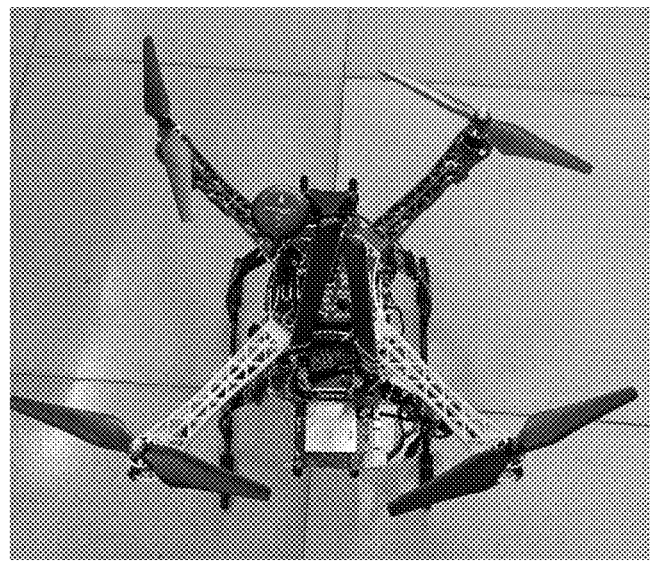
FIG. 5 shows an image of a physical UAV according to an embodiment of the present disclosure.
Figure 6:
FIG. 6 shows an image, of a virtual UAV, corresponding to the image of the physical UAV in FIG. 5.
Figure 7:
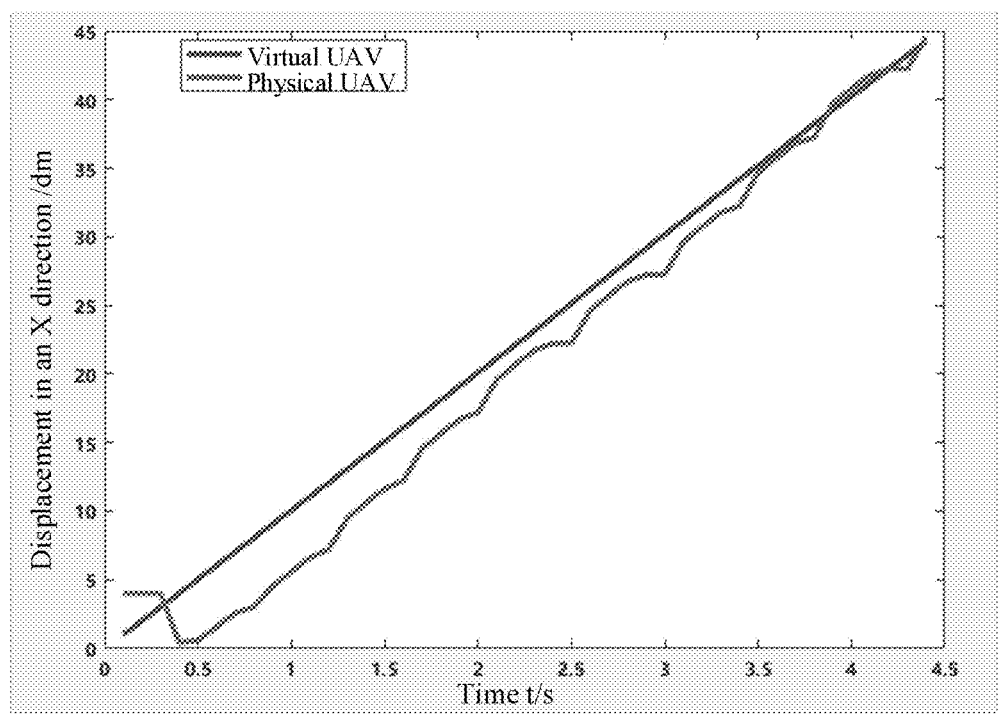
FIG. 7 shows a track of synchronizing a physical UAV to a virtual UAV according to an embodiment of the present disclosure.

A synchronization effect achieved by the method in this embodiment of the present disclosure is embodied by a four-rotor UAV. FIG. 5 shows an image of the physical UAV, and FIG. 6 is an image, of the virtual UAV, corresponding to FIG. 5. The virtual UAV is built based on Unity3D software, and the physical UAV is built based on a PX4 open-source controller. The virtual end and the physical end communicate with each other by using a 5G communication network. A maximum acceleration of the UAV is set to 0.22 m/s², and a maximum speed of the UAV is set to 2.47 m/s. Finally, a track of synchronizing the physical UAV to the virtual UAV is obtained, as shown in FIG. 7. In a verification process, controller parameters are not optimally tuned, and a selected parameter only ensures stability of the system. It can be seen from FIG. 7 that this method meets the requirement for synchronizing the virtual and real statuses of the digital twin system.

The method for synchronizing virtual and real statuses of a digital twin system of a UAV in this embodiment of the present disclosure fuses the outputs of the result parameter feedback control module and the process parameter feedback control module for state synchronization control of the digital twin system of the UAV, to realize result synchronization and ensure process synchronization; uses the milometer information of the UAV to observe a dynamic process of the UAV, and uses the finite-time milometer information, to avoid impact of the cumulative error; and introduces event trigger to status synchronization control of the digital twin system, to realize autonomous two-way synchronization of the digital twin system.

Figure 8:
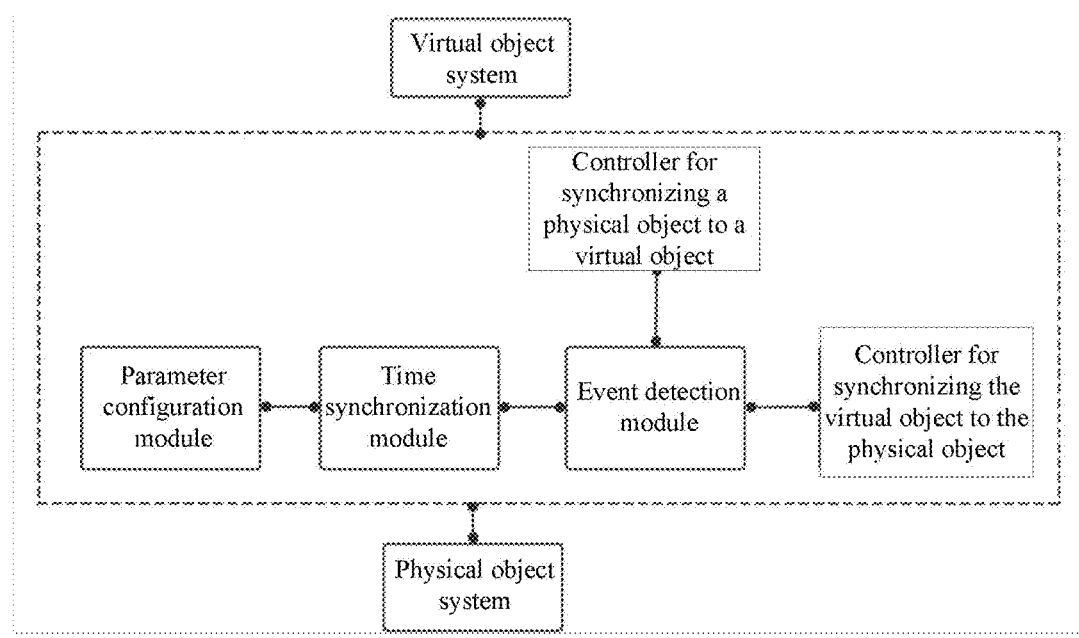
FIG. 8 is a schematic structural diagram of a system for synchronizing virtual and real statuses of a digital twin system of a UAV according to an embodiment of the present disclosure.

For ease of understanding, as shown in FIG. 8, the present disclosure provides an embodiment of a system for synchronizing virtual and real statuses of a digital twin system of a UAV. The system includes:

the following components of a UAV: a virtual object system, a physical object system, a parameter configuration module, a time synchronization module, an event detection module, a controller for synchronizing a physical object to a virtual object, and a controller for synchronizing the virtual object to the physical object.

The parameter configuration module is configured to perform parameter configuration for the virtual object system and the physical object system of the UAV.

The time synchronization module is configured to perform time synchronization between the virtual object system and the physical object system.

The event detection module is configured to detect an event trigger type, and trigger a corresponding synchronization controller based on the detected event trigger type, and the event trigger type may be a training event or a minoring event.

The controller for synchronizing the physical object to the virtual object is configured to: when the event detection module detects that the event trigger type is a trigger instruction of the training event, perform result synchronization and process synchronization for the virtual object system and the physical object system based on the training event.

The controller for synchronizing the virtual object to the physical object is configured to: when the event detection module detects that the event trigger type is a trigger instruction of the monitoring event, perform result synchronization and process synchronization for the virtual object system and the physical object system based on the monitoring event.

The controller for synchronizing the physical object to the virtual object and the controller for synchronizing the virtual object to the physical object have a same structure, and each include a result parameter feedback control module, a process parameter feedback control module, a fusion module, an output transformation module, and an event trigger switch module, where the result parameter feedback control module and the process parameter feedback control module each are connected to an input terminal of the fusion module, an output terminal of the fusion module is connected to the output transformation module, and the output transformation module is connected to the event trigger switch module.

An input quantity and a feedback quantity of the result parameter feedback control module of the controller for synchronizing the physical object to the virtual object are a status quantity of the virtual object and a status quantity of the physical object respectively, an input quantity and a feedback quantity of the process parameter feedback control module of the controller for synchronizing the physical object to the virtual object are finite-time mileage information of the virtual object and finite-time mileage information of the physical object respectively, and the event trigger switch module is connected to the physical object.

An input quantity and a feedback quantity of the result parameter feedback control module of the controller for synchronizing the virtual object to the physical object are the status quantity of the physical object and the status quantity of the virtual object respectively, an input quantity and a feedback quantity of the process parameter feedback control module of the controller for synchronizing the virtual object to the physical object are the finite-time mileage information of the physical object and the finite-time mileage information of the virtual object respectively, and the event trigger switch module is connected to the virtual object.

The event detection module is specifically configured to:

detect a current operation stage of a digital twin system; and if the current operation stage is a stage of training the physical object by the virtual object, detect a first deviation between a task track of the physical object and a task track of the virtual object, and trigger the monitoring event when the first deviation is less than a first preset value; or if the current operation stage is a stage of monitoring the physical object by the virtual object, detect a second deviation between a current status track of the virtual object and a training tack, and trigger the training event if the second deviation is greater than a second preset value.

The system for synchronizing virtual and real statuses of a digital twin system of a UAV in this embodiment of the present disclosure fuses outputs of the result parameter feedback control module and the process parameter feedback control module for state synchronization control of the digital twin system of the UAV, to realize result synchronization and ensure process synchronization; uses milometer information of the UAV to observe a dynamic process of the UAV, and uses the finite-time milometer information, to avoid impact of a cumulative error; and introduces event trigger to status synchronization control of the digital twin system, to realize autonomous two-way synchronization of the digital twin system.

The system for synchronizing virtual and real statuses of a digital twin system of a UAV in this embodiment of the present disclosure is used to execute the method for synchronizing virtual and real statuses of a digital twin system of a UAV in the above embodiment. A working principle of the system for synchronizing virtual and real statuses of a digital twin system of a UAV is the same as that of the method for synchronizing virtual and real statuses of a digital twin system of a UAV in the above embodiment, and a same technical effect can be achieved. Details are not described herein again.

The foregoing embodiments are used only to describe the technical solutions of the present disclosure, and are not intended to limit same. Although the present disclosure is described in detail with reference to the foregoing embodiments, those of ordinary skill in the art should understand that they can still modify the technical solutions described in the foregoing embodiments, or make equivalent substitutions to some technical features therein. These modifications or substitutions do not make the essence of the corresponding technical solutions depart from the spirit and scope of the technical solutions of the embodiments of the present disclosure.

What is claimed is:

1. A method for synchronizing virtual and real statuses of a digital twin system of an unmanned aerial vehicle (UAV), comprising:

a step of performing parameter configuration for a virtual object system and a physical object system of the UAV;

a step of performing time synchronization between the virtual object system and the physical object system;

a step of detecting an event trigger type, wherein the event trigger type comprises a training event and a minoring event, and wherein the step of detecting an event trigger type comprises detecting a current operation stage of the digital twin system; and if the current operation stage is a stage of training the physical object by the virtual object, detecting a first deviation between a task track of the physical object and a task track of the virtual object, and triggering the monitoring event when the first deviation is less than a first preset value; or if the current operation stage is a stage of monitoring the physical object by the virtual object, detecting a second deviation between a current status track of the virtual object and a training track, and triggering the training event if the second deviation is greater than a second preset value; and a step of triggering a corresponding synchronization controller based on the detected event trigger type, such that the synchronization controller performs result synchronization and process synchronization for the virtual object system and the physical object system based on the event trigger type, wherein a synchronization controller corresponding to the training event is a controller for synchronizing a physical object to a virtual object, and a synchronization controller corresponding to the monitoring event is a controller for synchronizing the virtual object to the physical object, wherein the controller for synchronizing the physical object to the virtual object and the controller for synchronizing the virtual object to the physical object have a same structure, and each comprise a result parameter feedback control module, a process parameter feedback control module, a fusion module, an output transformation module, and an event trigger switch module; the result parameter feedback control module and the process parameter feedback control module are respectively connected to an input terminal of the fusion module, an output terminal of the fusion module is connected to the output transformation module, and the output transformation module is connected to the event trigger switch module; and wherein in the controller for synchronizing the physical object to the virtual object, the result parameter feedback control module receives an input quantity and a feedback quantity from the virtual object and the physical object, respectively, wherein the input quantity comprises a status quantity of the virtual object and the feedback quantity comprises a status quantity of the physical object and the process parameter feedback control module receives an input quantity and a feedback quantity from the virtual object and the physical object, respectively, wherein the input quantity comprises finite-time mileage information of the virtual object and the feedback quantity comprises finite-time mileage information of the physical object and the event trigger switch module is connected to the physical object and wherein in the controller for synchronizing the virtual object to the physical object, the result parameter feedback control module receives an input quantity and a feedback quantity from the physical object and the virtual object, respectively, wherein the input quantity comprises the status quantity of the physical object and the feedback quantity comprises the status quantity of the virtual object and the process parameter feedback control module receives an input quantity and a feedback quantity from the physical object and the virtual object, respectively, wherein the input quantity comprises the finite-time mileage information of the physical object and the feedback quantity comprise the finite-time mileage information of the virtual object and the event trigger switch module is connected to the virtual object.

2. The method according to claim 1, wherein the result parameter feedback control module and the process parameter feedback control module adopt a proportional-integral-derivative (PID) control algorithm, a fuzzy control algorithm, or a sliding mode control algorithm.

3. The method according to claim 2, wherein a fusion formula of the fusion module is as follows:

$$y = \partial_1 \times u_1 + \partial_2 \times u_2$$

$$\partial_1 + \partial_2 = 1$$

wherein y represents an output of the fusion module, $u_1$ represents an output of the result parameter feedback control module, $u_2$ represents an output of the process parameter feedback control module, and $\theta_1$ and $\partial_2$ are weight coefficients.

4. The method according to claim 3, wherein a transformation formula of the output transformation module is as follows:

$$w = \begin{cases} L_{max}, & k \times y \geq L_{max} \\ k \times y, & \text{other cases} \\ L_{min}, & k \times y \geq L_{min} \end{cases}$$

wherein w represents an output of the output transformation module, y represents the output of the fusion module, k represents a to-be-tuned parameter, $L_{max}$ represents an upper output limit, and $L_{min}$ represents a lower output limit.

5. The method according to claim 1, further comprising:
   detecting whether current time reaches a preset time, and performing time synchronization between the virtual object system and the physical object system again if the current time reaches the preset time.

* * * * *